United States Patent Office 2,928,853
Patented Mar. 15, 1960

2,928,853

ESTERIFICATION AND CATALYSTS THEREFOR

George R. Bond, Jr., Paulsboro, N.J., assignor to Houdry Process Corporation, Wilmington, Del., a corporation of Delaware No Drawing. Application December 2, 1957
Serial No. 699,901

7 Claims. (Cl. 260—410.9)

The present invention relates to direct esterification of carboxylic acids and is particularly concerned with the production of esters of low volatility by reaction of acids and alcohols each boiling above 212° F., more especially an organic mono- or dicarboxylic acid having at least 6 carbon atoms (exclusive of carboxy carbon) with an aliphatic alcohol having at least 4 carbon atoms.

Among the objects of the present invention is the production of such higher molecular weight esters in acceptably high yields and at comparatively rapid rates without accompanying extensive production of olefinic by-products from dehydration of the alcohol.

A further object of the invention is the production of esters of acceptable to high quality, including low acid number, without substantial degradation in color of the product, from commercial grades of carboxy acids. By the method of the present invention one can in many instances obtain esters having lighter color than the starting technical grade acid.

These and other objects are accomplished in accordance with the invention by carrying out the esterification reaction at reflux temperatures and in the presence of a solid catalyst comprising a titanium sulfate such as the normal or basic sulfate ($TiOSO_4$).

The method can be practiced in conventional esterification apparatus heretofore proposed or employed for batch or continuous operation. Such apparatus embodies in general a still equipped with a reflux condenser and water trap and appropriate means for agitating the still contents. To assure completeness of reaction, the alcohol is usually used somewhat in excess of theoretical proportions and in batch operation is added as a whole to the acid plus catalyst in the still. The still contents are heated to reflux temperature at which a binary mixture of water and alcohol or water and acid distill over, the distillate being condensed to form a water layer which is collected and the organic reactant is continuously returned to the still. In some instances, particularly when low boiling aqueous binary mixtures are not readily formed, it may be found desirable to add a lower boiling organic water-immiscible diluent to the still contents to assist in carrying over the water. Conventional diluents for this purpose include: benzene, toluene, chloroform, carbon tetrachloride, etc. The end point of the reaction is readily ascertained when no more water is being evolved and condensed.

The invention finds particular advantage in the esterification of higher fatty acids (such as those found as glyceryl esters in oils and fats) with $C_4$ to $C_8$ alcohols as well as in the esterification of aromatic dicarboxy acids or their anhydrides with the same range of alcohols. Typical acid reactants are oleic acid, phthalic anhydride, mixed acids derived by hydrolysis of natural oils such as soya acids. The technical grade acids available are often of dark color because of content of impurities, and the production of lighter colored esters from such impure acids, attainable by the present invention, is an important commercial advantage.

The catalyst utilized to accelerate esterification in accordance with the invention is composed of a minor amount of the aforesaid titanium sulfate associated with a porous absorptive carrier, such catalyst preferably containing substantially no free sulfuric acid. The catalyst should contain at least 2% by weight titanium oxysulfate (determined as $TiOSO_4$) or equivalent Ti quantity of other titanium sulfate and may contain up to 35% or more. No advantage has been found for higher titanium content and in fact in some instances it has been found preferable for best quality product not to exceed 25% of the titanium sulfate by weight of catalyst.

A preferred form of catalyst is prepared by impregnating a porous absorptive mineral material (natural or synthetic) with an aqueous solution of titanium oxysulfate followed by drying and heat treating to drive off any excess $H_2SO_4$. Typical mineral materials that can be employed as carriers for the titanium sulfate include: infusorial earth, clays, silica gel, silica-alumina gel, and the like. Certain naturally occurring absorptive clays and earths already have an adequate content of titania (at least 1% $TiO_2$); these can be sulfated by treatment with sulfuric acid or $SO_3$ to provide the desired catalyst.

Among the advantages of the solid catalyst used in the present invention as opposed to liquid sulfuric acid and other liquid or dissolved catalysts is the ready separation of the catalyst from the esterification product such as by simple filtration. Moreover, such catalysts as sulfuric acid or p-toluene sulfonate, even if employed in association with solid absorbents or carriers give rise to the formation of sulfonated bodies which can be removed from the ester only with difficulty and, moreover, require the use of relatively pure (uncolored) carboxy acids as reactant to obtain esters which are uncolored or of desired light color. The same drawbacks attach in the use of solid catalysts such as potassium pyrosulfate which decomposes readily at reaction conditions to release free acid and also when used in quantities adequate to complete esterification in less than about an hour, gives rise to the production of dark colored esters. The acid number of the esters obtained in the use of the preferred titanium sulfate catalysts is quite low as compared with the catalysts containing or releasing free acid and conditions of operation can be readily controlled when using the titanium sulfate catalyst, to minimize dehydration of the alcohol without sacrifice of product quality or reaction speed. In addition, the titanium sulfate catalyst, after bulk separation from the reaction product can be reused for at least several times in further esterification, which number of times of reuse can be extended by simple purification techniques including removal of at least the absorbed water and solvent washing to remove residual ester products therefrom.

Good results in esterification are obtained using as little as 0.15% total supported titanium sulfate catalyst by weight of theoretical ester and corresponding to no more than about 0.02% $TiOSO_4$ by weight of the ester.

*Example 1*

Kaolin clay containing 1.98% $TiO_2$ (105° C. dry basis) was impregnated with concentrated sulfuric acid in an amount providing 62.66% $H_2SO_4$ (100% acid) by weight/clay (ignited $H_2O$-free basis) and then denned in circulating air for 72 hours at 300° F.

Two parts by weight of the catalyst thus obtained (calculated to contain about 4% $TiOSO_4$ by weight of original dry clay) were placed in a still together with 141.5 parts by weight oleic acid (U.S.P.) and 130.2 parts by weight of 2-ethyl hexanol-1. The still was heated at reflux temperature (350–408° F.) while stirring contents until water no longer distilled over, the alcohol from the reflux condensate being continuously returned to the still.

Reaction was very rapid, being completed in 25 minutes, with the theoretical amount, 9 parts of water, taken off. The reaction mixture was cooled under nitrogen (to avoid oxidation) and filtered off from the catalyst solids, then steam distilled to remove unreacted alcohol.

The ester thus obtained constituted 96.8% of calculated theoretical yield and showed on test an acid number of 1.2. The color of the ester was equal to that of the starting oleic acid (about 1.5 NPA) indicating that no degradation had taken place. Only 0.46% of the alcohol had been dehydrated to olefin during the run and this was removed with excess alcohol in steam distillation, as above.

The quantity of catalyst employed in the foregoing run constituted about 1% by weight of that of theoretical ester obtainable from the oleic acid. The run was repeated with one-tenth that quantity of the same catalyst, under which conditions it took 110 minutes to complete the run and the resulting ester had an acid number of 9.0. The results of this run indicated that the quantity of catalyst there employed (0.004% $TiOSO_4$ by weight of ester) was insufficient for good esterification.

Control runs were made using aluminum sulfate and iron sulfate respectively impregnated on infusorial earth. These materials showed very low catalyst activity from the standpoint of reaction time and poor product quality, indicating that the activity of the sulfated kaolin was evidently due to its content of titanium sulfate, which observation was confirmed in subsequent runs.

*Example II*

Infusorial earth ("Celite" brand) was impregnated with an aqueous solution of titanium sulfate using a solution comprising 500 grams [a mixture of $TiOSO_4$, $Ti(SO_4)_2$ and possibly other sulfates of titanium along with some excess acid and containing about 20% $TiO_2$ by weight of paste] per liter of water on each kilogram of the infusorial earth. The components were thoroughly admixed and dried in an oven at 110° C.; final catalyst contained about 17% by weight titanium compound determined as $TiOSO_4$.

The above catalyst was used in the esterification of oleic acid with 2-ethyl hexanol-1 (2 mols per mol acid) employing 0.3% catalyst by weight of theoretical ester obtainable. The reactants and catalyst were heated under reflux (324–404° F.) for 30 minutes when the theoretical mol of water had distilled over. The ester was separated by filtration and steam distilled in the same manner as above described.

The yield of ester was 99.5% of theory, the ester product having an acid number of 0.3 and an NPA color of about 1.75, showing very little color degradation. Only 0.14% of the alcohol was converted to olefins.

Another sample of the same catalyst after oven drying was heat treated at approximately 700° F. for one hour to drive off any residual $H_2SO_4$. The heat treated catalyst obtained (containing about 17% $TiOSO_4$) was used in esterification of the oleic acid-ethyl hexanol mixture as before, but using 0.15% catalyst by weight of ester theoretically obtainable from the reactants. In this run one hour was required at a recorded reflux temperature of 380–416° F. The recovery of ester was 99.7% of theory, which ester had an acid number of 0.6 and an NPA color of about 1.75.

*Example III*

Activated kaolin clay was impregnated with an aqueous titanium sulfate solution in an amount providing 10% commercial "titanium sulfate" by weight of the clay. The obtained catalyst containing 5% titanium compound as $TiOSO_4$ by weight was used in esterification of oleic acid with excess 2-ethyl hexanol in the manner previously described, employing 0.5% catalyst by weight of theoretically obtainable ester. The reaction took 93 minutes obtaining 98.2% (of theory) ester yield, which product had an acid number of 0.7, color of just about 1.

*Example IV*

The catalyst employed in this run was from a separately prepared batch of titanium sulfate on infusorial earth than that previously used, which contained about 17% $TiOSO_4$ by weight of catalyst after 370° C. heating for one hour.

The oleic acid and ethyl hexanol were used in the same proportions as in the preceding runs (1:2 mol) with 0.9% catalyst by weight of theoretical ester (equals 0.15% $TiOSO_4$ by weight of ester). The run was completed in 25 minutes with an ester yield of 97.9% (of theory) having an acid number of 0.8 and color of 1.75.

Similar results were obtained in other runs employing catalyst containing 17% $TiOSO_4$ on infusorial earth but used in the proportion of 0.3% catalyst on weight of ester (equals 0.05% $TiOSO_4$ on weight of ester). The color of the obtained ester was improved (lighter than starting acid) by running nitrogen into the still during the run, which apparently inhibited air oxidation. The alcohol conversion to olefin was only 0.17% in these runs.

*Example V*

The catalyst of the previous example containing 17% $TiOSO_4$ on infusorial earth after heat treating was employed in esterification of phthalic anhydride with 2.6 mol/mol of 2-ethyl hexanol, the catalyst being used in an amount furnishing 0.15% $TiOSO_4$ on theoretical ester weight basis. The run was carried out for 70 minutes at reflux temperature (395–457° F.). The obtained ester had an acid number of 1.9 and color of 0.25, there being only 0.58% of the alcohol dehydrated to olefin.

Similarly prepared catalyst (but not heat treated) used in esterification of phthalic anhydride with butanol (2.5 mol/mol) obtained a 95% ester yield of nearly water white color. Sulfuric acid under approximately the same run conditions required about 1½ times as long for the reaction and obtained a product of poorer color.

The NPA colors referred to in the above example approximately correspond in numerical grade to the ASTM color designations (D 155–45T) as determined by the use of the Union Colorimeter wherein the sample is matched against a numbered color standard, higher numbers indicating darker colors.

Obviously many modifications and variations of the invention as hereinbefore set forth may be made without departing from the spirit and scope thereof, and therefore only such limitations should be imposed as are indicated in the appended claims.

I claim:

1. The method of esterifying organic carboxylic acids having at least six carbon atoms in the hydrocarbon residue attached to carboxy with aliphatic alcohols of the alkanol series having at least four carbon atoms, which method comprises heating a mixture of such acid and alcohol at reflux temperature in the presence of a catalyst comprising titanium sulfate incorporated in a porous absorptive mineral, while continuously vaporizing water from the reaction mix, the titanium content of said catalyst corresponding to at least 2% by weight of $TiOSO_4$ and wherein said catalyst is employed in such amount as to furnish 0.02% titanium sulfate (as $TiOSO_4$) by weight of ester theoretically obtainable from the acid and alcohol.

2. The method according to claim 1 wherein said catalyst comprises 2 to 35% by weight of titanium oxysulfate.

3. The method according to claim 1 wherein said catalyst is composed of sulfated kaolin clay, said kaolin clay prior to sulfation containing at least 1% sulfatable titania (on basis of $TiO_2$).

4. The method according to claim 1 wherein said acid is a higher fatty acid having up to 17 carbon atoms exclusive of carboxy groups.

5. The method according to claim 1 wherein said acid is a higher fatty acid and said alcohol is an octanol.

6. A catalyst capable of accelerating esterification reactions, composed of sulfated kaolin containing 2 to 35% by weight of titanium sulfate (determined as $TiOSO_4$).

7. A catalyst capable of accelerating esterification reactions comprising 2 to 35% by weight titanium oxysulfate on a siliceous carrier.

References Cited in the file of this patent

UNITED STATES PATENTS

| | | |
|---|---|---|
| 2,180,576 | Baylis et al. | Nov. 21, 1939 |
| 2,192,000 | Wilson | Feb. 27, 1940 |